(12) United States Patent
Vielhaber et al.

(10) Patent No.: US 10,968,239 B2
(45) Date of Patent: Apr. 6, 2021

(54) FUNCTIONALIZED ALUMINUM REAGENTS

(71) Applicant: The Goodyear Tire & Rubber Company, Akron, OH (US)

(72) Inventors: Margaret Flook Vielhaber, Kent, OH (US); Seth Cody Ensign, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 16/400,088

(22) Filed: May 1, 2019

(65) Prior Publication Data
US 2020/0347083 A1  Nov. 5, 2020

(51) Int. Cl.
*C07F 7/10* (2006.01)
*C08K 5/56* (2006.01)
*C08F 36/06* (2006.01)

(52) U.S. Cl.
CPC ............... *C07F 7/10* (2013.01); *C08F 36/06* (2013.01); *C08K 5/56* (2013.01)

(58) Field of Classification Search
None
See application file for complete search history.

(56) References Cited

U.S. PATENT DOCUMENTS

| | | | |
|---|---|---|---|
| 3,332,919 | A | 7/1967 | Marktscheffel et al. |
| 4,215,014 | A | 7/1980 | Langer, Jr. |
| 7,411,018 | B2 | 8/2008 | Appel et al. |

FOREIGN PATENT DOCUMENTS

| | | |
|---|---|---|
| EP | 0004739 A2 | 10/1979 |
| JP | 54147191 A | 11/1979 |
| WO | 2010139450 A1 | 12/2010 |
| WO | 2011014533 A1 | 2/2011 |
| WO | 2017189120 A8 | 6/2018 |

OTHER PUBLICATIONS

Eisch et al., J Organomet Chem (1974), 64(1), 41-55 (Year: 1974).*

(Continued)

*Primary Examiner* — Alexander R Pagano
(74) *Attorney, Agent, or Firm* — John D. DeLong

(57) ABSTRACT

The invention is directed to functionalized aluminum reagents of formula 1

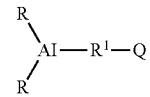

where R is a linear or branched alkane group containing 1 to 8 carbon atoms, and $R^1$ is phenylene, or a linear or branched alkane diyl group containing 2 to 10 carbon atoms, or a combination of one or more phenylene groups and one or more linear or branched alkane diyl groups containing 1 to 10 carbon atoms; Q is of formula 2

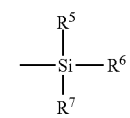

where $R^5$, $R^6$ and $R^7$ are independently a linear or branched alkyl group containing 1 to 3 carbon atoms or a group of formula 3

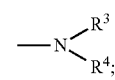

where $R^3$ and $R^4$ are independently phenyl or a linear or branched alkyl group containing 1 to 10 carbon atoms, or $R^3$ and $R^4$ taken together with the nitrogen atom represent a nitrogen containing heterocyclic group containing from 4 to 12 carbon atoms; or $R^5$, $R^6$ and $R^7$ taken together with the silicon atom represent a structure of formula 4

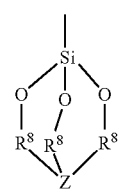

where $R^8$ is C1 to C4 linear or branched alkanediyl and Z is N or a group of formula 5

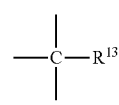

wherein $R^{13}$ is C1 to C8 alkyl.

3 Claims, 1 Drawing Sheet

(56) References Cited

OTHER PUBLICATIONS

Ibragimov et al., Russian Chemical Bulletin (1998), 47(4), 691-694 (Year: 1998).*
John J. Eisch et al., Journal of Organometallic Chemistry. 64 (1974) 41-55 (Year: 1974).*
A. G. Ibragimov,* Russian Chemical Bulletin, vol. 47, No. 4, Apr. 1998 (Year: 1998).*
Abby R. O'Connor, et al., The Mechanism of Polymerization of Butadiene by "Ligand-Free" Nickel(II) Complexes, J. Am. Chem. Soc., 2007, pp. 4142-4143, 129.
Cottet, et al., Copper-Catalyzed Asymmetric Conjugate Addition of Alkenyl-and Alkylalanes to α,β-Unsaturated Lactams, Organic Letters, Department of Organic Chemistry, University of Geneva, Jan. 29, 2013, pp. 828-831, vol. 15, No. 4, American Chemical Society.
Cueny, et al., Selective Quench-Labeling of the Hafnium-Pyridyl Amido-Catalyzed Polymerization of 1-Octene in the Presence of Trialkyl-Aluminum Chain-Transfer Reagents, ACS Catal. 2018, 8, 2018, pp. 11605-11614, Department of Chemistry, University of Wisconsin, Madison.
Eisch, Hydroalumination of C=C and C≡C, Reduction: Selectivity, Strategy & Efficiency in Modern Organic Chemistry, 1991, vol. 8.
Evans, et al., Lanthanide Metallocene Reactivity with Dialkyl Aluminum Chlorides: Modeling Reactions Used to Generate Isoprene Polymerization Catalysts, Organometallics, 2005, pp. 570-579, 24, American Chemical Society.
Gao, et al., α-Selective Ni-Catalyzed Hydroalumination of Aryl-and Alkyl-Substituted Terminal Alkynes: Practical Syntheses of Internal Vinyl Aluminums, Halides, or Boronates, Department of Chemistry, Merkert Chemistry Center, Jul. 15, 2010, pp. 10961-10963, 132, J. Am. Chem. Soc.
German, et al., Telechelic Polyethylene from Catalyzed Chain-Growth Polymerization, Angew. Chem. Int. Ed. 2013, 2013, pp. 3438-3441, 52, Wiley-VCH Verlag GmbH & Co. KGaA, Weinheim.
Hannes Leicht et al, Stereoselective Copolymerization of Butadiene and Functionalized 1,3-Dienes, Stereoselective Copolymerization of Butadiene and Functionalized 1,3-Dienes, Jun. 9, 2016 (Jun. 9, 2016), 777-780, vol. 5, No. 6, ACS Macro Letters, Konstanz, DE.
Jian, et al., Living catalyzed-chain-growth polymerization and block copolymerization of isoprene by rare-earth metal allyl precursors bearing a constrained-geometry-conformation ligand, The Royal Society of Chemistry 2010, Mar. 25, 2010, pp. 3022-3024, 46, Chem. Commun.
Kaita, et al., Ultimately Specific 1,4-cis Polymerization of 1,3-Butadiene with a Novel Gadolinium Catalyst, Macromol. Rapid Commun., 2003, pp. 179-184, 24, No. 2, Wiley-VCH Verlag GmbH & Co. KGaA.
Makio, et al., Synthesis of Telechelic Olefin Polymers via Catalyzed Chain Growth on Multinuclear Alkylene Zinc Compounds, Journal of the American Chemical Society, 2013, pp. 8177-8180, 135, ACS Publication.
May, et al., Formation of Vinyl-, Vinylhalide-or Acyl-Substituted Quaternary Carbon Stereogenic Centers through NHC-Cu-Catalyzed Enantioselective Conjugate Additions of Si-Containing Vinylaluminums β-Substituted Cyclic Enones, Department of Chemistry, Merkert Chemistry Center, Dec. 20, 2010, pp. 736-739, 133, J. Am. Chem. Soc. 2011.
Mei, et al., Enantioselective construction of remote quaternary stereocentres, Nature, Apr. 17, 2014, pp. 340-344, vol. 508.
Müller, et al., New Experimental Conditions for Tandem hydroalumination/Cu-Catalyzed Asymmetric Conjugate Additions β-Substituted Cyclic Enones, Organic Letters, Department of Organic Chemistry, University of Geneva 30, May 18, 2011, pp. 3040-3043, vol. 13, No. 12, American Chemical Society.
Norsic, et al., Divinyl-End-Functionalized Polyethylenes: Ready Access to a Range of Telechelic Polyethylenes through Thiol-Ene Reactions, Derivatization of Polymers, Angew. Chem. Int. Ed. 2015, 2015, pp. 4631-4635, 54, Wiley-VCH Verlag GmbH & Co. KGaA, Weinheim.
Ottou, et al., Amino End-Functionalized Polyethylenes and Corresponding Telechelics by Coordinative Chain Transfer Polymerization, Macromolecules, Oct. 17, 2017, pp. 8372-8377, 50, ACS Publications.
Sonnek, Aluminiumalkyle mit Heteroatomen, Journal of Organometallic Chemistry, 1987, pp. 31-41, 329, Elsevier Sequoia S.A., Lausanne, The Netherlands.
Valente et al., Coordinative Chain Transfer Polymerization, Chem. Rev. 2013, 113, Feb. 7, 2013, pp. 3836-3857, ACS Publications, American Chemical Society.
Xu, et al., Zirconium-Catalyzed Asymmetric Carboalumination of Unactivated Terminal Alkenes, Acc. Chem. Res., ACS Publications, Sep. 29, 2016, pp. 2158-2168, 49, Herbert C. Brown Laboratories of Chemistry, Purdue University.
Hayashi, Tetsuo et al, Manufacture of polyolefins, Manufacture of polyolefins, Database accession No. 1988:38593, XP055731 009, Chemical Abstracts Service, Columbus, Ohio, US.
Quirk et al., Butadiene polymerization using neodymium versatate-based catalysts: catalyst optimization and effects of water and excess versatic acid, Polymer, Elsevier Science Publishers B.V., GB, Jul. 1, 2000, pp. 5903-5908, vol. 41, No. 15.
European Search Report for Serial No. EP20171898 dated Sep. 29, 2020.

* cited by examiner

2 Dimensional Correlational Analysis: NOSY

2 Dimensional Correlational Analysis: COSY

FUNCTIONALIZED ALUMINUM REAGENTS

BACKGROUND

Coordinative chain transfer polymerization (CCTP) using main group metals, i.e. a reversible chain transfer of polymeryl chains between chain growth active metal centers and chain growth inactive metal centers, has become an important strategy in insertion polymerization to reduce the amount of polymerization catalysts, to control the molecular weight and molecular weight distribution of polymers as well as to introduce chain end-functionalization by appropriate quenching of main group metal polymeryls. See Valente et al., Chem. Rev. 2013, 113, 3836-3857; Jian et al., Chem. Commun. 2010, 46, 3022-3024; German et al., Angew. Chem. Int. Ed. 2013, 52, 3438-3441. (b) Norsic et al., Angew. Chem. Int. Ed. 2015, 54, 4631-4635; Makio et al., J. Am. Chem. Soc. 2013, 135, 8177-8180.

Most commonly, commercially available un-functionalized aluminum and zinc alkyls have been employed, with zinc alkyls much better performing in terms of transfer effi-ciency and thus molecular weight control. With respect to heteroatom-functionalized main group metal alkyls, recently homoleptic di(w-aminoalkyl) magnesium reagents have been used as chain transfer reagents to yield end functionalized amino polyethylenyl magnesiums (Ottou et al., Macromolecules 2017, 50, 8372-8377.) Functionalized magnesium reagents were also employed to initiate polybutadiene chain growth to end-functionalized high trans polybutadiene (Leicht et al., Macromolecules 2018, 51, 763-770.), or with increased chain transfer numbers, to functionalized polybutadienes of less uniform stereochemistry (WO201013945.)

In contrast, both in organic synthesis and in polymer chemistry, heteroatom-functionalized aluminum reagents have scarcely been used as synthetically useful reactants for the transfer of functional group substituted carbon nucleophiles probably owing to drawbacks in the synthesis of homoleptic aluminum alkyls or the expectedly low chemoselectivity of mixed aluminum alkyls (Xu et al., Acc. Chem. Res. 2016, 49, 2158-2168; Gao et al., J. Am. Chem. Soc., 2010, 132, 10961-10963; May et al., Org. Lett., 2011, 13, 3040-3043.)

SUMMARY

The present invention is directed to functionalized aluminum reagents of formula 1

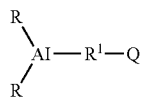

where R is a linear or branched alkane group containing 1 to 8 carbon atoms, and $R^1$ is phenylene, or a linear or branched alkane diyl group containing 2 to 10 carbon atoms, or a combination of one or more phenylene groups and one or more linear or branched alkane diyl groups containing 1 to 10 carbon atoms; Q is of formula 2

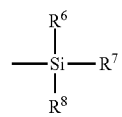

where $R^6$, $R^7$ and $R^8$ are independently a linear or branched alkyl group containing 1 to 3 carbon atoms or a group of formula 3

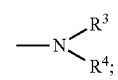

where R3 and R4 are independently phenyl or a linear or branched alkyl group containing 1 to 10 carbon atoms, or R3 and R4 taken together with the nitrogen atom represent a nitrogen containing heterocyclic group containing from 4 to 12 carbon atoms; or $R^6$, $R^7$ and $R^8$ taken together with the silicon atom represent a structure of formula 4

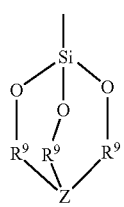

where $R^9$ is C1 to C4 linear or branched alkanediyl and Z is N or a group of formula 5

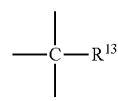

wherein $R^{13}$ is C1 to C8 alkyl.

There is further disclosed a method of making functionalized aluminum reagents.

BRIEF DESCRIPTION OF THE DRAWINGS

FIG. —1 shows a 2 Dimensional Correlational Analysis: NOSY.

FIG. —2 shows a 2 Dimensional Correlational Analysis: COSY.

DESCRIPTION

Figure 1:
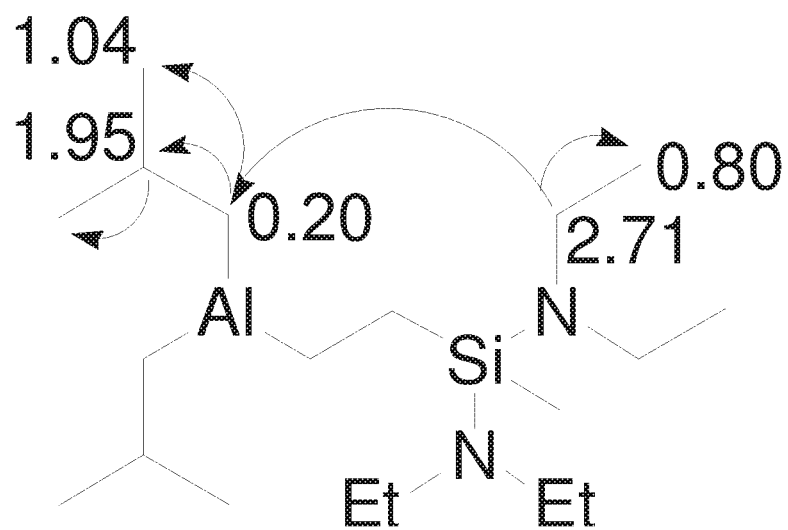

There are disclosed functionalized aluminum reagents formula 1

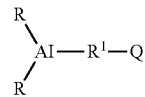

where R is a linear or branched alkane group containing 1 to 8 carbon atoms, and $R^1$ is phenylene, or a linear or branched alkane diyl group containing 2 to 10 carbon atoms, or a combination of one or more phenylene groups and one or more linear or branched alkane diyl groups containing 1 to 10 carbon atoms; Q is of formula 2

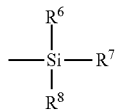

2 where $R^6$, $R^7$ and $R^8$ are independently a linear or branched alkyl group containing 1 to 3 carbon atoms or a group of formula 3

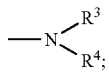

3 where R3 and R4 are independently phenyl or a linear or branched alkyl group containing 1 to 10 carbon atoms, or R3 and R4 taken together with the nitrogen atom represent a nitrogen containing heterocyclic group containing from 4 to 12 carbon atoms; or $R^6$, $R^7$ and $R^8$ taken together with the silicon atom represent a structure of formula 4

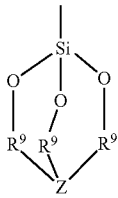

4 where $R^9$ is C1 to C4 linear or branched alkanediyl and Z is N or a group of formula 5

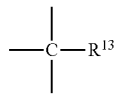

5 wherein $R^{13}$ is C1 to C8 alkyl.

There is further disclosed a method of making functionalized aluminum reagents.

Functionalized aluminum reagents of formula 1 may be produced by reaction of an olefinic silane 6 with a dialkyl aluminum hydride 7 in the presence of a neodymium catalyst

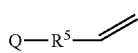

6

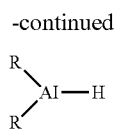

7 where $R^5$ is phenylene, or a linear or branched alkane diyl group containing 1 to 9 carbon atoms, or a combination of one or more phenylene groups and one or more linear or branched alkane diyl groups containing 1 to 10 carbon atoms, and R and Q are as previously defined.

The reaction of the compounds of formulas 6 and 7 may be done neat at a temper-ature ranging from 25 to 90° C. for 12 to 72 hours. Optionally, the reaction may proceed in a hy-drocarbon solvent in the presence of a neodymium (III) catalyst.

In one embodiment, the compound of formula 7 is diisobutyl aluminum hydride (DIBAL-H).

In various embodiments, the functionalized aluminum reagent of formula 1 may be one of the following compounds A, B or C (Et=ethyl, Me=methyl):

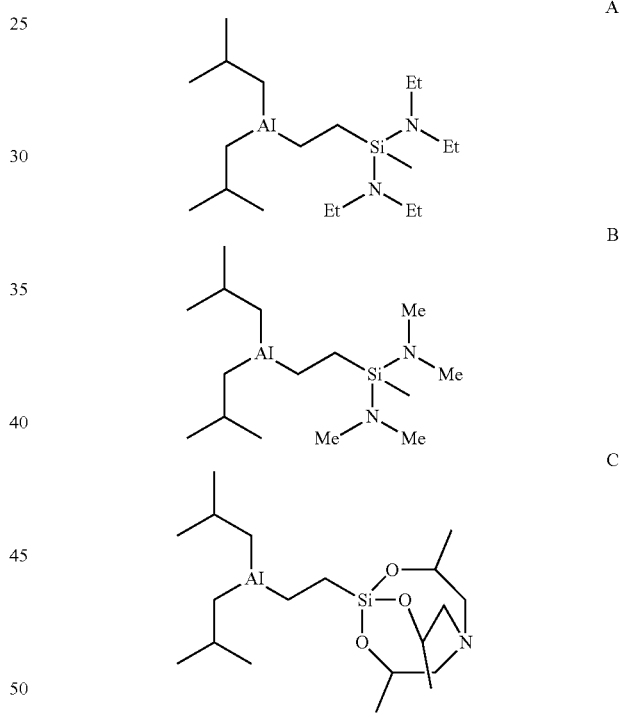

The functionalized aluminum reagents are useful for example as activators for lanthanide-based catalysts in polymerization of conjugated dienes.

The invention is further illustrated by the following non-limiting examples.

Example 1

Preformed Neodymium Catalyst

The following reaction was performed in a nitrogen-filled glove box. To a 20 mL oven dried vial was added butadiene premix (6.0 mL, 15% w/w, 11.1 mmol, 40 equiv) and triiso-butylaluminium (6.4 mL, 25% w/w, 5.58 mmol, 20 equiv). Neodymium(III) versatate (560 μL, 0.50 M, 0.279 mmol, 1.0 equiv) was then added, the vial was sealed with a teflon cap, and shaken for 60 minutes. Diethylaluminum chloride (700 µL, 25% w/w, 0.697 mmol, 2.5 equiv) was then added and the catalyst was shaken overnight to produce a preformed neodymium catalyst.

Synthesis of Compound A

The following reaction was performed in a nitrogen-filled glove box. To a screw-cap NMR tube was added $C_6D_6$ (200 µL), bis(diethylamino)methylvinyl silane (89 µL, 0.25 mmol, 1.0 equiv), diisobutylaluminum hydride (275 µL, 1.0 M in toluene, 0.275 mmol, 1.1 equiv), and the preformed neodymium catalyst (242 µL, 0.0207 M, 0.0050 mmol, 2 mol %). The tube was sealed with a Teflon cap, removed from the glove box, and heated to 80° C. for 48 h. Analysis of the reaction mixture showed 81% conversion of the starting reagent.

Figure 2:
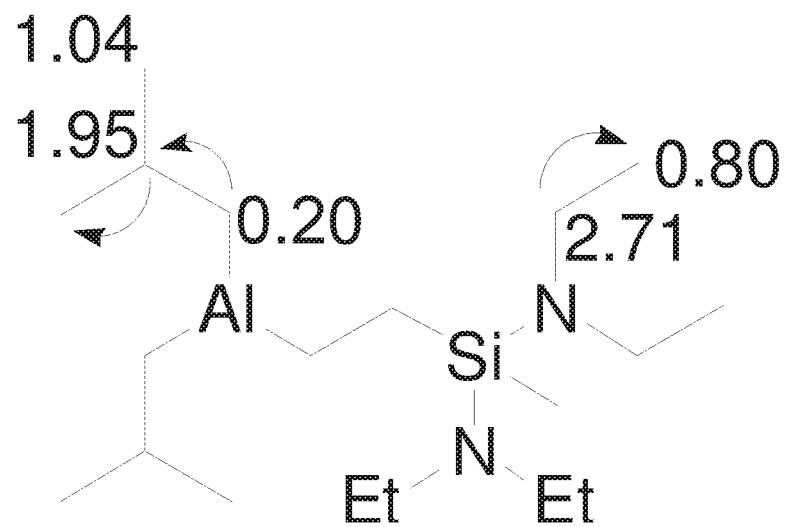

The reaction product was analyzed by 1D and 2D NMR with results given in Table 1 and FIGS. 1 and 2. Values are given as chemical shift (δ) referenced to residual solvent.

$^1H$ NMR: δ 7.15 ppm for $C_6D_6$.

TABLE 1

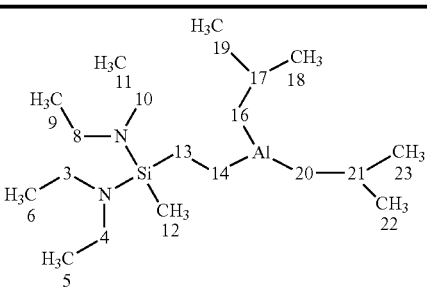

| Atom | Predicted $^1H$* | Predicted $^{13}C$* | Observed $^1H$ | Observed $^{13}C$ |
|---|---|---|---|---|
| 3,4,8,10 | 2.8-3.0 | 39.9 | 2.5-3.0 | 38-42 |
| 5,6,9,11 | 1.1-1.2 | 17.0 | 0.75-1.0 | 18.4 |
| 12 | 0.12 | -4.7 | 0.0-0.2 | -4.5 |
| 13,14 | 0.5-0.6 | 26.4 | 0.2-0.4 | 12-14 |
| 16,20 | 0.31-0.37 | 19.3 | 0.1-0.26 | 22 |
| 17,21 | 1.85-1.95 | 25.0 | 2.0-1.75 | 25-28 |
| 18,19,22,23 | 0.9-1.0 | 26.4 | 1.0-1.2 | 27 |

The invention claimed is:

1. A functionalized aluminum reagent of formula 1

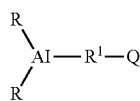

wherein R is a linear or branched alkane group containing 1 to 8 carbon atoms, and $R^1$ is phenylene, or a linear or branched alkane diyl group containing 2 to 10 carbon atoms, or a combination of one or more phenylene groups and one or more linear or branched alkane diyl groups containing 1 to 10 carbon atoms; Q is of formula 2

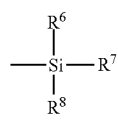

wherein $R^6$, $R^7$ and $R^8$ are independently a linear or branched alkyl group containing 1 to 3 carbon atoms or a group of formula 3

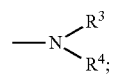

where $R^3$ and $R^4$ are independently phenyl or a linear or branched alkyl group containing 1 to 10 carbon atoms wherein at least one of $R^6$, $R^7$ and $R^8$ is of formula 3, or $R^3$ and $R^4$ taken together with the nitrogen atom represent a nitrogen containing heterocyclic group containing from 4 to 12 carbon atoms; or $R^6$, $R^7$ and $R^8$ taken together with the silicon atom represent a structure of formula 4

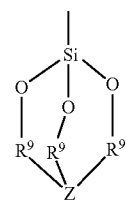

wherein $R^9$ is C1 to C4 linear or branched alkanediyl and Z is N or a group of formula 5

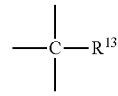

wherein $R^{13}$ is C1 to C8 alkyl.

2. The functionalized aluminum reagent of claim 1, selected from the group consisting of

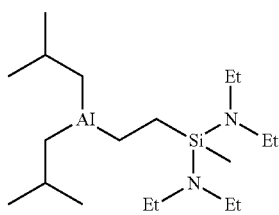

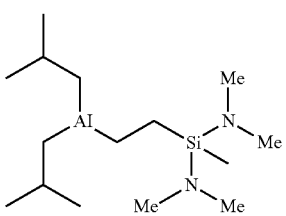

-continued

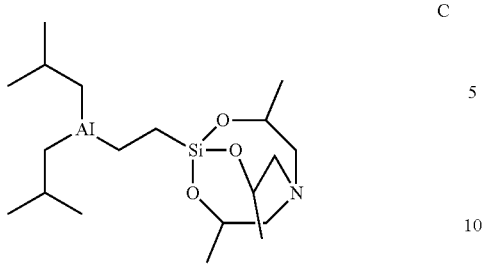

C

3. A method of making the functionalized aluminum reagent of claim 1, comprising the step of reaction of an olefinic silane 6 with a dialkyl aluminum hydride 7 in the presence of a neodymium catalyst

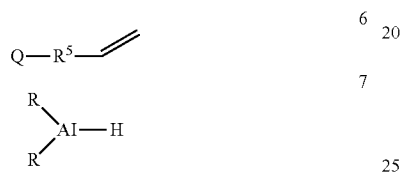

wherein $R^5$ is phenylene, or a linear or branched alkane diyl group containing 1 to 9 carbon atoms, or a combination of one or more phenylene groups and one or more linear or branched alkane diyl groups containing 1 to 10 carbon atoms, and R and Q are as previously defined.

* * * * *